United States Patent [19]

Marquis et al.

[11] Patent Number: 4,722,919

[45] Date of Patent: Feb. 2, 1988

[54] SYNTHESIS OF VANADIUM/PROPYLENE GLYCOL COMPLEXES

[75] Inventors: Edward T. Marquis, Austin; John R. Sanderson, Leander, both of Tex.

[73] Assignee: Texaco Inc., White Plains, N.Y.

[21] Appl. No.: 916,075

[22] Filed: Oct. 6, 1986

[51] Int. Cl.$^4$ .............................................. B01J 31/22
[52] U.S. Cl. ...................................... 502/171; 556/42
[58] Field of Search ........................... 502/171; 556/42

[56] References Cited

U.S. PATENT DOCUMENTS 2,795,549  6/1957  Abbott et al. .................... 556/42 X
4,072,631  2/1978  Vogt et al. ........................... 502/171

FOREIGN PATENT DOCUMENTS 1469  1/1970  Japan .................................... 502/171

Primary Examiner—Patrick P. Garvin
Attorney, Agent, or Firm—Jack H. Park; Kenneth R. Priem; Carl G. Ries

[57] ABSTRACT

Complexes made by reacting propylene glycol with a vanadium compound soluble therein at an elevated temperature. Mild stripping of the water subsequent to complex formation is preferred. The ratio of moles of propylene glycol to gram atoms of vanadium in the complex forming reaction ranges from 7:1 to 20:1.

12 Claims, No Drawings

SYNTHESIS OF VANADIUM/PROPYLENE GLYCOL COMPLEXES

BACKGROUND OF THE INVENTION

1. Field of the Invention

The invention relates to the methods for making catalytically effective vanadium/propylene glycol complexes.

2. Prior Art

A process for the manufacture of substituted epoxides from alpha olefins such as propylene styrene, etc., was reported by John Kollar in the 1960's. His U.S. Pat. No. 3,351,635 teaches that an organic epoxide compound can be made by reacting an olefinically unsaturated compound with an organic hydroperoxide in the presence of a molybdenum, tungsten, titanium, columbium, tantalum, rhenium, selenium, chromium, zirconium, tellurium or uranium catalyst.

Kollar's U.S. Pat. No. 3,350,422 teaches a similar process using a soluble vanadium catalyst. The patent teaches the use of hydrocarbon soluble vanadium compounds such as the naphthenates, stearates, octoates, carbonyls, etc., and also the use of chelates and enol salts such as acetoacetonates. It is recommended that a basic substance such as an alkali metal or alkaline earth metal compound (e.g., sodium naphthenate, potassium stearate, sodium or potassium hydroxides, alkoxides, etc.) be used with the vanadium catalysts to improve their efficiency.

Chan-Cheng Su et al. in an article entitled "Metal Ion Catalysis of Oxygen-Transfer Reactions—Vanadium and Molybdenum Chelates as Catalysts in the Epoxidation of Cycloalkanes" (*Inorganic Chemistry*, Vol. 12, No. 2, 1973, pp. 337–342) disclose the use of soluble vanadium compounds such as vanadyl acetylacetonate, vanadyl bis(dipivaloylmethide), vanadyl hexafuoroacetyacetonate, etc. The article reports that benzene solutions deteriorated on standing for several hours.

Gould et al. in an article entitled "Metal Ion Catalysis of Oxygen Transfer Reactions" (*Journal of the American Chemical Society*, Aug. 1968, 90:17, pp. 4573–4579), disclose the reaction of tert. butyl hydroperoxide with cyclohexene in the presence of vanadium acetylacetonates and vanadium octoate. The authors noted that the solutions showed deterioration on standing.

In U.S. Pat. No. 4,434,975 to ARCO, investigators found that molybdenum catalysts could be made from saturated alcohols or glycols having one to four carbon atoms, such as ethylene glycol and propylene glycol, by reacting them with molybdenum metal and an organic hydroperoxide, peroxide, or $H_2O_2$. Molybdenum compounds prepared by reacting an ammonium-containing molybdate with a hydroxy compound, for example, an organic primary or secondary alcohol, a glycol or a phenol, are described in U.S. Pat. Nos. 3,784,482 and 3,787,329 to Cavitt.

Further, U.S. Pat. No. 3,573,226 to Sorgenti discloses that molybdenum-containing epoxidation catalyst solutions may be made by heating molybdenum powder with a stream containing unreacted tertiary butyl hydroperoxide and polyhydric compounds of from about 200 to 300 molecular weight and having from 4 to 6 hydroxyl groups per molecule. These catalysts are used for the epoxidation of propylene according to U.S. Pat. No. 3,666,777 to Sorgenti.

U.S. Pat. No. 3,953,362 to Lines et al. reveals that novel molybdenum epoxidation catalysts may be prepared by reacting an oxygen-containing molybdenum compound with hydrogen peroxide and an amine and optionally water or an alkylene glycol at elevated temperatures. Similar catalysts are prepared by reacting an oxygen-containing molybdenum compound with an amine and an alkylene glycol at elevated temperatues according to U.S. Pat. No. 4,009,122 also to Lines et al.

SUMMARY OF THE INVENTION

The invention concerns vanadium complexes made by reacting a vanadium compound such as an ammonium-containing vanadium compound with propylene glycol to provide complexes that are useful as catalysts.

DETAILED DESCRIPTION OF THE PREFERRED EMBODIMENTS

The improvements in the complexes of this invention relate to the discovery that storage stable complexes can be prepared by reacting propylene glycol with a vanadium compound.

The vanadium compounds of this invention are preferably vanadium compounds which contain ammonium ligands as well as oxygen. Such materials include ammonium metavanadate, and hydrates forms thereof, vanadium triisopropoxide oxide, vanadium tri-n-propoxide oxide, vanadyl acetylacetonate, vanadium pentoxide, etc.

Propylene glycol is the other co-reactant used to make the vanadium complexes of this invention.

For the propylene glycol/vanadium compound system, the preferred reactant ratios are 7:1 to 20:1 expressed in terms of moles of propylene glycol to gram atoms of vanadium in the vanadium compound. A preferred range of moles of propyl ene glycol to gram atoms of vanadium is 8:1 to 16:1. To provide the best complex in terms of vanadium content, ease of processing and stability upon standing, the proportion of water remaining in the complex should be in the range of 0.1 to 2.0 wt. %. The reaction temperature to make the inventive complexes should be between about 80° and 130° C., preferably 90° to 120° C., and the pressure should be atmospheric. High reaction temperatures, on the order of 165° to 180° C. with vanadium complex preparations lead to sharply reduced vanadium contents and large formation of solids. With the technique of this invention, liquid complexes with vanadium contents of 2 to 9% are possible. Typically, these vanadium contents are 3 to 6% or of the narrower range of 3 to 4%. Such high levels of vanadium in stable liquid complexes are much better than those attainable by the prior art and are suitable for commercial use. Generally, no filtration is required for the best complexes of this invention. In a preferred embodiment, the reactants are heated to about 90° to 120° C. for about one hour, cooled and then subjected to a vacuum of 10 to 100 mm Hg to remove water and propylene glycol, for 30 to 60 minutes. The temperature of the pot should rise to about 90° to 110° C. during the stripping and the pressure should be adjusted to achieve and maintain this temperature. Sufficient overhead is removed so that the complex bottoms amount to about 70 to 95 wt. % of the charge and the water content of the catalyst is preferably in the 0.1 to 2 wt. % range. Generally, the water content of the final complex should be between about 0.1 and 3.0 wt. %.

It should be noted that these complexes are surprisingly made very simply and require no corrosive acids, amines, etc. They are made at mild temperatures and with short reaction times. The complexes require very little or no filtration and appear to remain stable indefinitely. In addition, the processing costs and reactant costs to make these complexes are minimal.

The complexes and method of this invention are more particularly illustrated by the following examples which should not be construed as limiting the invention in any way.

Since the vanadium/propylene glycol complexes of this invention titrate as acids, even though they have no free acidic groups, they are useful as acid catalyst substitutes. For example, the instant complexes may be useful cyclization catalysts for splitting out water such as in the production of tetrahydrofuran from 1,4-butane diol and hydroxyethylpiperazine from triethylenediamine. The complexes of this invention are useful as catalysts for hydroxylations such as the production of resorcinol from toluene in the presence of a hydroperoxide, carbonate formations from olefins, carbon dioxide and a hydroperoxide, and oxygenate formations from hydrocarbons and organic hydroperoxides. Other catalytic uses for these complexes include condensations, dehydrations, esterifications, oligomerizations, polymerizations, disproportionations and rearrangements other than those mentioned. The vanadium/glycol complexes are also useful as corrosion inhibitors in antifreeze formulations and as direct additives to oils, greases and other lubricating fluids.

The examples herein also illustrate the use of the complexes of this invention as catalysts in epoxidation reactions, which have already been mentioned. Before addition, the complex-catalyst solution is usually premixed with one of the reactants, typically the hydroperoxide, such as a t-butyl alcohol (TBA) solution of t-butyl hydroperoxide (TBHP).

It is well known that soluble vanadium complexes efficiently catalyze the epoxidation of olefins to olefin oxides in the presence of t-butyl hydroperoxide.

The epoxidations are typically conducted by reacting an olefin with an organic hydroperoxide in the presence of a catalyst and a solvent. When the olefin is propylene and the hydroperoxide is tertiary butyl hydroperoxide. The products are propylene oxide (PO) and tert. butyl alcohol. As noted above, the catalyst is usually incorporated into one or the other of the reactants prior to introduction to the reactor.

Preferably, the catalyst concentration is from 200 to 600 ppm based on the combination of the olefin and the organic hydroperoxide. Further, the reaction should be conducted at a temperature in the range of 50° to 180° C., preferably 90° to 140° C. and especially in the range of about 100° to 130° C. Another unusual aspect is that the preferred mole ratio of olefin to hydroperoxide is unusually low; on the order of from about 0.9:1 to 3.0:1. All of these characteristics, together with the complexes of this invention as catalysts, provide an epoxidation process which gives excellent results.

Another preferred embodiment of the epoxidations involves conducting the reaction in two stages, approximately equal in length, with the first stage at a lower temperature than the second stage. For instance, the first hour of reaction would preferably be conducted at a temperature in the range of 50° to 120° C. followed by the second and last hour of reaction at about 120° to 150° C.

CATALYST PREPARATIONS

EXAMPLE 1 (5940-55)

A 1-liter round-bottomed flask was equipped with a mechanical stirrer, thermometer, K head and condenser, $N_2$ inlet and $N_2$ bubbler. To the flask was added 310 g EG (5.0 moles) and 29.2 g ammonium metavanadate ($NH_4VO_3$, 0.25 moles, Alfa). The reactants were heated to 100° C. with stirring under a $N_2$ pad and held at 100° C. for one hour. The reaction mixture was cooled to 50° C. and a vacuum pulled on the reaction mixture to remove EG and water overhead. The heat was turned on at this point also. The mixture was heated from 50° C. to 100° C. in about 10 minutes with the pressure decreasing from 50 mm to 28 mm. The reaction mixture was held at 100° C. for approx. 18 minutes while the vacuum improved from 28 mm. to 10 mm. About 33.1 g were removed overhead (flask cooled) and 9.3 g were in a dry ice cold trap. The cold trap contents analyzed for 78.7% water while the overhead was 9.20% water. The reaction mixture was filtered to get 286.5 g filtrate. Analysis of the filtrate showed 4.1% vanadium content (AA), % $N_2$=0.23 (Kjeldahl), % water=0.38 (Karl Fisher), and an acid number of 37.47 (mg KOH/g sample). Six weeks later the filtrate was inspected and found to be more viscous than when first filtered and though most of the filtrate was clear and solids free there were some solids on the walls and bottom of the bottle.

EXAMPLE 7 (5940-61)

Using the apparatus and procedure described above 304 g PG (4.0 moles) were reacted with 23.4 g AMV (0.2 moles) at 100° C. for 1.0 hour. The reaction mixture was cooled to 45° C. and a vacuum pulled to remove overhead. The heat was turned on and the reaction mixture heated from 45° C. to 100° C. over a 15 minute period with the pressure decreasing from 60 mm to 40 mm. The stripping was continued at 100° C. for 15 minutes with the vacuum improving from 40 mm to 20 mm. The cold trap contained 3.0 g of material (91.6% water) and the overhead flask contained 24.4 g (18.4% water). The filtrate amounted to 279.5 g and contained 2.17% vanadium, 0.14% water, 0.40% $N_2$, and had an acid number of 27.40 mg KOH/g sample. Five weeks later the filtrate was inspected and found to be clear, brown and no solids present. Another inspection after seventeen aditional days revealed the filtrate still clear and solids free.

EXAMPLES 1-10 (See Table I)

Note that the only AMV+EG catalyst that was clear for several weeks was Example 6 and after 7-8 weeks there were solids in the bottom of Example 7. Examples of catalysts made with AMV and PG were clear and have remained clear, solids free, storage stable for approximately 2 months, Examples 7-10. It is very surprising and unexpected that vanadium/propylene glycol complexes would be more storage stable than the corresponding ethylene glycol/vanadium complexes. In the case of molybdenum complexes the ethylene glycol/molybdenum complexes were as storage stable or more storage stable than the propylene glycol/molybdenum complexes.

EXAMPLES 11-13 (Table II)

EXAMPLE 11

Using the same apparatus and procedure as described in Example 1, except in Example 11 ethylene glycol was mixed with vanadium pentoxide ($V_2O_5$) in the absence of $NH_3$. As can be seen from Table II, only 0.22% vanadium was incorporated in the catalyst when no $NH_3$ was used. The filtrate, clear at first, soon had solids on bottom of bottle.

EXAMPLE 12

In Example 12, the mole ratio of EG to gram atom V ($V_2O_5$) was 25/1 and the mole ratio of $NH_3$ to gram atom V was 2/1 (add 16.6 ml $NH_4OH$). The filtrate contained 4.01% vanadium, but after a few days, the filtrate was filled with thick hazy solids.

EXAMPLE 13

In Example 13, the mole ratio of EG to gram atom V ($V_2O_5$) was again 25/1, but the mole ratio of $NH_3$ to gram atoms V was 3/1 (add 24.8 ml $NH_4OH$). The filtrate contained 4.72% vanadium. After a few days, inspection showed the filtrate to contain thick viscous solids.

EXAMPLES 14-16 (Table II)

EXAMPLE 14

In Example 14, the mole ratio of propylene glycol (PG) to gram atoms vanadium was 25/1 ($V_2O_5$) and no ammonia was added. From the results in Table II, we can see that only 0.53% vanadium was present in the catalyst. Inspection of the catalyst after four days and again after seventeen more days showed the catalyst to be clear and solids free.

EXAMPLE 15

In Example 15, the mole ratio of PG/V was 25/1, and the mole ratio of ammonia to gram atoms vanadium was 2/1 (16.6 ml $NH_4OH$). The catalyst contained 3.06% vanadium and has remained clear and solids free for three weeks after preparation. Clear, solids free on inspection after one month.

EXAMPLE 16

In Example 16, the mole ratio of PG/V was 25/1 and the mole ratio of $NH_3$ to gram atoms vanadium was 3/1 (24.8 ml $NH_4OH$). The filtrate (catalyst) contained 2.13% vanadium and has remained clear and solids free for three weeks since its preparation. After eighteen days it was clear, solids free.

TABLE I

Catalysts Made by Reacting Ammonium Meta Vanadate (AMV) with Glycols Such as Ethylene or Propylene Glycol[11]

| Ex. No. | NB Run # Date | ROH | G.ROH | M.ROH | G.AMV | G.A.V | MR A/V | Temp °C. | Stripping Temp °C. | Time | Wt % V | % $N_2$ | % $H_2O$ | Acid # | % V in |
|---|---|---|---|---|---|---|---|---|---|---|---|---|---|---|---|
| 1 | 5940-55[1] 10/15 | EG | 310.0 | 5.000 | 29.20 | .2500 | 20.00 | 100 | 50-100 100 | 10 18 | 4.10 | 0.23 | 0.38 | 37.47 | 92.35 |
| 2 | 5940-56[2] 10/16 | EG | 248.0 | 4.000 | " | " | 16.00 | 100 | 40-100 100 | 17 12 | 5.80 | 0.21 | 0.30 | 48.47 | 102.87 |
| 3 | 5940-57[3] 10/17 | EG | 217.0 | 3.500 | " | " | 14.00 | 100 | 50-100 100 | 5 13 | 6.20 | 0.62 | 0.49 | 50.90 | 96.02 |
| 4 | 5940-58[4] 10/18 | EG | 240.0 | 4.000 | 38.98 | .3333 | 12.00 | 100 | 65-100 100 | 7 16 | 6.10 | 1.11 | 0.85 | 60.69 | 83.73 |
| 5 | 5940-59[5] 10/19 | EG | 248.0 | 4.000 | " | " | 12.00 | 115 | 40-109 | 18 | 8.94 | 1.87 | 0.92 | 50.63 | 117.70 |
| 6 | 5940-60[6] 10/22 | EG | 248.0 | 4.000 | " | " | 12.00 | 130 | 60-110 | 10 | 4.91 | 1.04 | 0.37 | 37.19 | 53.75 |
| 7 | 5940-61[7] 10/23 | PG | 304.0 | 4.000 | 23.40 | .2000 | 20.00 | 100 | 45-100 100 | 15 15 | 2.17 | 0.40 | 0.14 | 27.40 | 59.50 |
| 8 | 5940-62[8] 10/24 | PG | 304.0 | 4.000 | 29.20 | .2500 | 16.00 | 100 | 35-100 100 | 10 10 | 3.37 | 0.46 | 0.88 | 37.11 | 75.98 |
| 9 | 5940-63[9] 10/25 | PG | 212.8 | 2.800 | 23.40 | .2000 | 14.00 | 100 | 35-100 100 | 15 18 | 3.93 | 0.50 | 0.32 | 20.97 | 74.95 |
| 10 | 5940-64[10] 10/26 | PG | 202.7 | 2.667 | 26.00 | .2222 | 12.00 | 100 | 30-14 100 100 | 10 7 | 3.83 | 1.70 | 0.52 | 38.81 | 57.12 |

[1] Filtered B/C = 84.5%; 11/30 vis. some solids; 12/17 vis. some solids.
[2] Filtered B/C = 81.4%; 11/30 v.v.vis. solids; 12/17 v.v.vis. solids.
[3] Filtered B/C = 80.0%; 11/30 v.v.vis. solids; 12/17 v.v.vis. solids.
[4] Filtered B/C = 81.3%; 11/30 v.v.vis. solids; 12/17 v.v.vis. solids.
[5] Filtered B/C = 78.0%; 11/30 v.v.vis. solids; 12/17 v.v.vis. solids.
[6] Filtered B/C = 64.8%; 11/30 clear, green, no solids. Inspected 12/17 few solids at bottom of bottle.
[7] Filtered B/C = 85.4%; 11/30 clear, no solids; 12/17 clear, no solids.
[8] Filtered B/C = 86.1%; 11/30 clear, no solids; 12/17 clear, no solids.
[9] Filtered B/C = 82.3%; 11/30 clear, no solids; 12/17 clear, no solids.
[10] Filtered B/C = 73.8%; 11/30 clear, no solids; 12/17 clear, no solids.
[11] Reaction time for Examples 1-10 was 1 hour.

TABLE II

Catalysts Made by Reacting Vanadium Pentoxide with EG or PG in the Absence or Presence of Ammonium Hydroxide

| Ex. No. | NB Run # Date | ML $NH_4OH$ | Moles $NH_3$ | MR $NH_3$/V | Reaction Temp | Hrs | Stripping Temp °C. | Min | Wt % V | % $N_2$ % $H_2O$ | Acid # % V in | Comments - Phys. State |
|---|---|---|---|---|---|---|---|---|---|---|---|---|
| 11 | 5940-65[1] 11/14 | None | 0.000 | 0.0/1 | 100 | 1.0 | 40-100 100 | 15 40 | 0.22 | 0.07 0.10 | 3.38 4.43 | 11/30 Clear Solids Btm; 12/17 Solids |
| 12 | 5940-66[1] 11/15 | 16.6 | 0.266 | 2.0/1 | 100 | 1.0 | 40-100 100 | 15 15 | 4.01 | 0.22 1.39 | 19.28 88.75 | 11/30 Thick Hazy Solids; 12/17 Solids |
| 13 | 5940-67[1] 11/16 | 24.8 | 0.399 | 3.0/1 | 100 | 1.0 | 40-100 100 | 18 12 | 4.72 | 0.23 0.15 | 17.42 106.96 | 11/30 Thick Vis. Solids; 12/17 Solids |

TABLE II-continued

Catalysts Made by Reacting Vanadium Pentoxide with EG
or PG in the Absence or Presence of Ammonium Hydroxide

| Ex. No. | NB Run # Date | ML NH$_4$OH | Moles NH$_3$ | MR NH$_3$/V | Reaction Temp | Hrs | Stripping Temp °C. | Min | Wt % V | % N$_2$ % H$_2$O | Acid # % V in | Comments - Phys. State |
|---|---|---|---|---|---|---|---|---|---|---|---|---|
| 14 | 5940-68[(2)] 11/26 | None | 0.000 | 0.0/1 | 100 | 1.0 | 50-98 98-99 | 13 7 | 0.53 | 0.27 0.02 | 6.30 15.72 | 11/30 Clear; 12/17 Clear |
| 15 | 5940-69[(2)] 11/27 | 16.6 | 0.266 | 2.0/1 | 100 | 1.0 | 30-100 100 | 10 7 | 3.06 | 0.17 0.17 | 27.48 91.69 | 11/30 Clear; 12/17 Clear |
| 16 | 5940-70[(2)] 11/29 | 24.8 | 0.399 | 3.0/1 | 100 | 1.0 | 40-100 100 | 15 20 | 2.13 | 0.23 0.07 | 18.43 58.14 | 11/30 Clear; 12/17 Clear |

[(1)]ROH = EG; G.ROH = 206.7; M.ROH = 3.333; G.V$_2$O$_5$ = 12.125; G.A. V = 0.1333; MR A/V = 25.0/1.
[(2)]ROH = PG; G.ROH = 253.1; M.ROH = 3.333; G.V$_2$O$_5$ = 12.125; G.A. V = 0.1333; MR A/V = 25.0/1.

With reference to Table I, it will be noted that the vanadium/ethylene glycol complexes all contained solids and were viscous whereas the vanadium/propylene glycol complexes of the present invention were clear, as prepared, and remained free from solids on standing.

The results summarized in Table II show the same pattern, both in the absence and in the presence of ammonium hydroxide. The vanadium/ethylene glycol complexes contained solids whereas the vanadium/propylene glycol complexes were solids-free as formed and remained free from solids on standing.

EPOXIDATION

Epoxidation of Allyl Alcohol

These examples are directed to the coproduction of glycidol and tertiary butyl alcohol from allyl alcohol and tertiary butyl hydroperoxide. Glycidol is the reaction product of primary interest.

EXAMPLE 17 (6000-97)

A 300 ml stainless steel autoclave was purged with nitrogen and 66.2 grams of allyl alcohol were added. A solution of tert. butyl hydroperoxide in tertiary butyl alcohol was prepared which contained 72.36% tert. butyl hydroperoxide, 27.44% tert. butyl alcohol and 0.2% water. About 2 grams of the vanadium/propylene glycol complex from run 5940-62 (Example 8) was added to 123.7 grams of the tert. butyl hydroperoxide solution and the catalyst/tert. butyl hydroperoxide solution was added to the autoclave. The thus-prepared reaction mixture was heated to 110° C., held at that temperature for two hours and then cooled to room temperature. About 192 grams of reactor effluent was recovered.

A sample of the reactor effluent was titrated for hydroperoxide and it was found that the effluent contained about 6.7% of unreacted tert. butyl hydroperoxide. G.L.C. analysis of the effluent indicated that about 32.7% of glycidol was present together with about 7.9% of unreacted allyl alcohol. Tertiary butyl alcohol was formed as a coproduct.

Conversion of the tert. butyl hydroperoxide was calculated to be 85.6% and the selectivity to glycidol, basis the tert. butyl hydroperoxide reacted was calculated to be 99.55%.

The mole ratio of allyl alcohol to tert. butyl hydroperoxide in the reaction mixture was about 1.148/1.

EXAMPLE 18 (6000-96)

Example 17 was repeated except that the mole ratio of allyl alcohol to tert. butyl hydroperoxide was 1.154/1 and the reaction was conducted at 100° C. The conversion of the tert. butyl hydroperoxide was 77.6% and the selectivity to glycidol, basis tert. butyl hydroperoxide reacted was essentially quantitative.

EXAMPLE 19 (6000-98)

Example 17 was repeated except that the mole ratio of allyl alcohol to tert. butyl hydroperoxide was 1.155/1 and the reaction was conducted at 120° C. The conversion of the tert. butyl hydroperoxide was about 92.3% and the selectivity to glycidol, basis tert. butyl hydroperoxide reacted, was about 89.4%.

The foregoing examples are given by way of illustration only, and are not intended as limitations on the scope of this invention, which is defined by the appended claims.

We claim:

1. Clear, storage stable propylene glycol solutions of vanadium complexes containing ammonium ligands and oxygen and free from precipitated solids for at least 17 days made by the process comprising:
   a. reacting excess propylene glycol at an elevated temperature between about 80° and 130° C. with either an ammonium vanadate or a mixture of ammonium hydroxide with a vanadium oxide soluble in said propylene glycol in an amount such that the ratio of moles of propylene glycol to gram atoms of vanadium in the vanadium compound ranges from about 7:1 to 20:1, and
   b. subsequently stripping the product from step a. under a vacuum of 10 to 100 mm Hg to give a propylene glycol solution of a vanadium complex amounting to about 70 to 95 wt. % of the charge and having a final water content of about 0.1 to 3 wt. % and, optionally, filtering the stripped product to thereby provide said storage stable propylene glycol solution.

2. The vanadium complexes of claim 1 in which the ratio of moles of propylene glycol to gram atoms of vanadium ranges from abut 8:1 to 16:1.

3. The vanadium complexes of claim 1 in which the vanadium comound is an ammonium-containing vanadium compound.

4. A vanadium complex as in claim 3 wherein the vanadium compound is ammonium metavanadate.

5. A vanadium complex as in claim 1 wherein the vanadium compound is a vanadium oxide.

6. A vanadium complex as in claim 5 wherein the vandium oxide is vanadium pentoxide.

7. A method of preparing a clear storage stable propylene glycol solution of a vanadium complex containing ammonium ligands and oxygen free from precipitated solids for at least 17 days comprising:
   a. reacting excess propylene glycol at an elevated temperature between about 90° and 110° C. with either an ammonium vanadate or a mixture of ammonium hydroxide with a vanadium oxide soluble in said propylene glycol in an amount such that the ratio of moles of propylene glycol to gram atoms of vanadium in the vanadium compound ranges from about 7:1 to 20:1, and b. subsequently stripping the product from step a. under a vacuum of 10 to 100 mm Hg to give a propylene glycol solution of a vanadium complex amounting to about 70 to 95 wt. % of the charge and having a final water content of about 0.1 to 3 wt. % and optionally, filtering the stripped product to thereby provide said storage stable propylene glycol solution.

8. A method as in claim 7 wherein the ratio of moles of propylene glycol to gram atoms of vanadium ranges from about 8:1 to about 16:1.

9. A method as in claim 8 wherein the vanadium compound is an ammonium-containing vanadium compound.

10. A method as in claim 9 wherein the vanadium compound is ammonium metavanadate.

11. A method as in claim 7 wherein the vanadium compound is a vanadium oxide.

12. A method as in claim 11 wherein the vanadium oxide is vanadium pentoxide.

* * * * *